US011077558B2

(12) United States Patent
Ohm et al.

(10) Patent No.: US 11,077,558 B2
(45) Date of Patent: Aug. 3, 2021

(54) UNMANNED GROUND VEHICLE WITH COMPACT MANIPULATOR STOWING

(71) Applicant: FLIR DETECTION, INC., Stillwater, OK (US)

(72) Inventors: Timothy R. Ohm, Grover Beach, CA (US); Annan Michael Mozeika, Groton, MA (US); Richard Therrien, Tyngsboro, MA (US); James Lindsay, West Boylston, MA (US)

(73) Assignee: FLIR DETECTION, INC., Stillwater, OK (US)

( * ) Notice: Subject to any disclaimer, the term of this patent is extended or adjusted under 35 U.S.C. 154(b) by 295 days.

(21) Appl. No.: 16/323,417

(22) PCT Filed: Aug. 7, 2017

(86) PCT No.: PCT/US2017/045736
§ 371 (c)(1),
(2) Date: Feb. 5, 2019

(87) PCT Pub. No.: WO2018/027219
PCT Pub. Date: Feb. 8, 2018

(65) Prior Publication Data
US 2019/0168391 A1    Jun. 6, 2019

Related U.S. Application Data

(60) Provisional application No. 62/371,422, filed on Aug. 5, 2016.

(51) Int. Cl.
*B25J 11/00* (2006.01)
*B25J 19/02* (2006.01)
(Continued)

(52) U.S. Cl.
CPC ............. *B25J 11/002* (2013.01); *B25J 5/005* (2013.01); *B25J 13/006* (2013.01);
(Continued)

(58) Field of Classification Search
CPC ........ B25J 11/002; B25J 19/02; B25J 13/006; B25J 15/0028; B25J 19/023; B25J 5/005;
(Continued)

(56) References Cited

U.S. PATENT DOCUMENTS

2007/0209844 A1    9/2007  Kamimura
2008/0183332 A1    7/2008  Ohm et al.
(Continued)

OTHER PUBLICATIONS

Communication of European publication number and information on the application of Article 67(3) EPC for European Patent Application Serial No. 17837815.4 (dated May 15, 2019).
(Continued)

*Primary Examiner* — Basil T. Jos
(74) *Attorney, Agent, or Firm* — Haynes and Boone, LLP

(57) ABSTRACT

Unmanned ground vehicles configured for compact manipulator stowing are disclosed. In some examples, an unmanned ground vehicle includes a main body and a drive system supported by the main body. The drive system includes right and left driven track assemblies mounted on right and left sides of the main body. A manipulator arm is pivotally coupled to the main body and configured to extend from a stowed position to an extended position, and the manipulator arm in the stowed position is contained entirely within a geometric volume of the right and left driven track assemblies.

20 Claims, 12 Drawing Sheets

(51) Int. Cl.
     *B25J 13/00*      (2006.01)
     *B25J 15/00*      (2006.01)
     *B25J 5/00*      (2006.01)
     *G05D 1/00*      (2006.01)

(52) U.S. Cl.
     CPC ........... *B25J 15/0028* (2013.01); *B25J 19/02* (2013.01); *B25J 19/023* (2013.01); *G05D 1/0022* (2013.01); *G05D 2201/0207* (2013.01); *G05D 2201/0209* (2013.01)

(58) Field of Classification Search
     CPC ......... G05D 1/0022; G05D 2201/0207; G05D 2201/0209
     See application file for complete search history.

(56) References Cited

U.S. PATENT DOCUMENTS

| | | |
|---|---|---|
| 2011/0040427 A1 | 2/2011 | Ben-Tzvi |
| 2011/0168460 A1 | 7/2011 | Goldenberg et al. |
| 2013/0152724 A1 | 6/2013 | Mozeika et al. |
| 2013/0152727 A1 | 6/2013 | Mozeika et al. |
| 2013/0268118 A1* | 10/2013 | Grinstead ................ B25J 5/005 700/259 |

OTHER PUBLICATIONS

Notification of Transmittal of the International Search Report and the Written Opinion of the International Searching Authority, or the Declaration for the International Application No. PCT/US2017/045736 (dated Oct. 31, 2017).

* cited by examiner

UNMANNED GROUND VEHICLE WITH COMPACT MANIPULATOR STOWING

PRIORITY CLAIM

This application claims the benefit of U.S. Provisional Patent Application Ser. No. 62/371,422 filed Aug. 5, 2016, the disclosure of which is incorporated herein by reference in its entirety.

TECHNICAL FIELD

This specification relates generally to autonomous vehicles and more particularly to unmanned ground vehicles with manipulators.

BACKGROUND

Modern day warfighters, law enforcement personnel, and rescue personnel have a need to employ unmanned ground robots for various missions. For personnel on dismounted (on foot) operations, the robot needs to be compact and lightweight as it is often carried in a backpack. In order to fit within standard issue backpacks, the robots are often modular systems—with the primary robot mobility chassis being carried separately from the manipulator or other mission-specific payloads. These payloads are often carried in separate packs by multiple personnel. When preparing for a robot mission, the payloads must be "assembled" to the base robot mobility chassis. This preparation process takes time and coordination amongst the individuals carrying the separate robot modules.

SUMMARY

This specification describes unmanned ground vehicles configured for compact manipulator stowing. In some examples, an unmanned ground vehicle includes a main body and a drive system supported by the main body. The drive system includes right and left driven track assemblies mounted on right and left sides of the main body. A manipulator arm is pivotally coupled to the main body and configured to extend from a stowed position to an extended position, and the manipulator arm in the stowed position is contained entirely within a geometric volume of the right and left driven track assemblies.

The control systems described in this specification may be implemented in hardware, software, firmware, or combinations of hardware, software and/or firmware. In some examples, the control systems described in this specification may be implemented using a non-transitory computer readable medium storing computer executable instructions that when executed by one or more processors of a computer cause the computer to perform operations. Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements the subject matter described in this specification may be located on a single device or computing platform or may be distributed across multiple devices or computing platforms.

DETAILED DESCRIPTION

Figure 1:
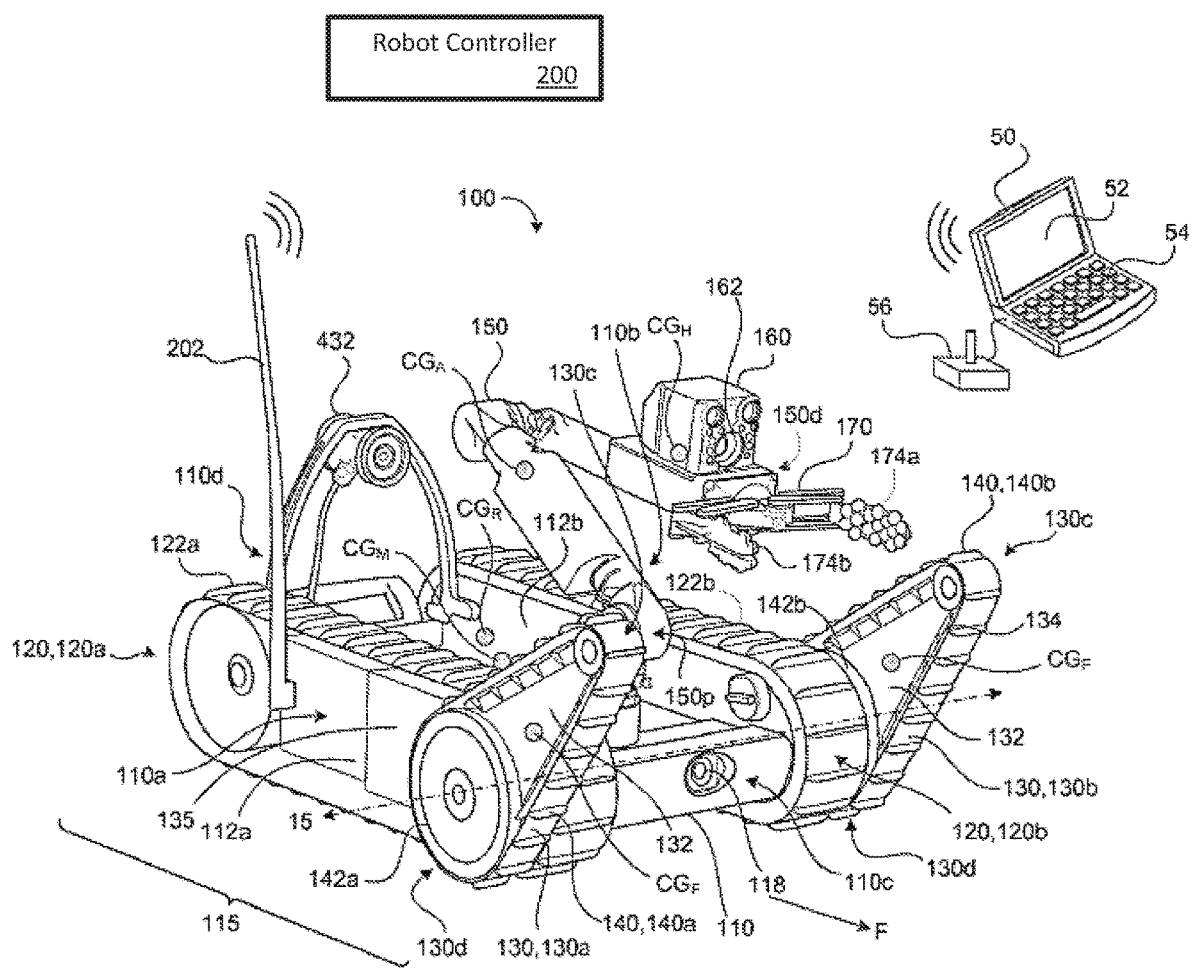
FIG. 1 illustrates an example mobile robotic vehicle that may be used as an unmanned ground vehicle.

FIG. 1 illustrates an example mobile robotic vehicle 100 that may be used as an unmanned ground vehicle capable of conducting operations in various environments such as urban terrain, tunnels, sewers, and caves. Moreover, the robot 100 may aid in the performance of urban Intelligence, Surveillance, and Reconnaissance (ISR) missions, chemical/Toxic Industrial Chemicals (TIC), Toxic Industrial Materials (TIM), and reconnaissance. Although the robot 100 shown includes a track driven drive system having flippers, other mobility platforms, configurations and morphologies are possible as well, such as wheel driven platforms, crawling or walking platforms, and so on.

The robot 100 can be designed to move about in a variety of environments, including an urban environment of buildings (including staircases), streets, underground tunnels, building ruble, and in vegetation, such as through grass and around trees. The robot 100 may have a variety of features which provide robust operation in these environments, including impact resistance, tolerance of debris entrainment, and invertible operability.

The robot 100 includes a main body 110 (or chassis) having a drive system 115 supported by the main body 110. The main body 110 has right and left sides 110a, 110b as well as a leading end 110c, a trailing end 110d and a center of gravity $CG_M$. In the example shown, the main body 110 includes right and left rigid side plates 112a, 112b disposed parallel to each other. At least one transverse support 114 rigidly couples the right side place 112a to the left side plate 112b. The rigid components are designed for strength and low weight and can be made from a material such as 7075-T6 aluminum. Alternative versions of the robot 100 can use other materials, such as other lightweight metals, polymers, or composite materials. The robot 100 may be electrically powered (e.g. by a bank of standard military BB-2590 replaceable and rechargeable lithium-ion batteries).

In some implementations, the drive system 115 includes right and left driven track assemblies 120a, 120b (also referred to as the main tracks 120) mounted on the corresponding right and left sides 110a, 110b of the main body 110 and having right and left driven tracks 122a, 122b respectively. Each driven track 122a, 122b is trained about a corresponding front wheel, which rotates about a drive axis 15. Although the robot 100 is depicted as having skid steer driven tracks, other drive systems are possible as well, such as differentially driven wheels, articulated legs, and the like.

The robot 100 includes at least one extendable flipper 130 mounted on the main body 110. In some examples, the robot 100 is configured to releasably receive one or more flippers 130 onto the main body 110 (e.g., onto and concentric with one of the front drive wheels at the leading end 110c of the main body 110). As shown in FIG. 1, the robot 100 includes right and left flippers 130a, 130b, which are shown in an extended configuration extending beyond the front or leading end 110c of the main body 110.

The flippers 130, 130a, 130b each have a distal end 130c, a pivot end 130d, and a flipper center of gravity $CG_F$ between the distal and pivot ends 130c, 130d. Each flipper 130, 130a, 130b pivots about the drive axis 15 near the leading end 110c of the main body 110. Moreover, each flipper 130, 130a, 130b may have a driven flipper track 140, 140a, 140b trained about flipper drive wheel 142a, 142b, which is driven about the drive axis 15 at the pivot end 130d of the flipper 130a, 130b.

In the example shown, flipper track supports 134 disposed on a flipper side plate 132 of the flipper 130 support the corresponding flipper track 140. In some implementations, the flippers 130, 130a, 130b can be rotated in unison in a continuous 360 degrees between a stowed position, in which the flippers 130a, 130b are next to the right and left side plates 112a, 112b of the main body 110, and at least one deployed position, in which the flippers 130a, 130b are pivoted at an angle with respect to the main tracks 122a, 122b. The center of gravity $CG_R$ of the robot 100 can be contained within an envelope of the 360 degree rotation of the flippers 130a, 130b.

In some implementations, the flipper side plates 132 of the respective right and left flippers 130a, 130b are rigidly coupled to one another through the articulator shaft to move together in unison. In other implementations, the flippers 130a, 130b pivot independently of each other. The combination of main tracks assemblies 120a, 120b and flippers 130, 130a, 130b provide an extendable drive base length to negotiate gaps in a supporting surface. In some examples, the right main tack 122a and the right flipper track 140a are driven in unison and the left main tack 122b and the left flipper track 140b are driven in unison to provide a skid steer drive system.

The main body 110 may include one or more cameras 118 disposed near the leading end 110c of the main body 110 and may be positioned to have a field of view directed forward and/or upward. The camera(s) 118 may capture images and/or video of the robot environment for navigating the robot 100 and/or performing specialized tasks, such as maneuvering through tunnels, sewers, and caves, etc.

The robot 100 may include one or more robotic manipulator arms 150 (e.g., articulated arms) each having a pivot end 150p pivotally coupled to the main body 110 and a distal end 150d that may be configured to receive a head 160 or a gripper 170 or both. The arm 150 may be coupled to the main body 110 in a manner that allows the arm 150 to be stowed along the main body 110 in a compact configuration and pivot away from main body 110 to allow a wider range of CG-shifting, for example, to negotiate obstacles.

As shown in FIG. 1, a head 160 and a gripper 170 are mounted on the distal end 150d of the arm 150. The arm 150 has an arm center of gravity $CG_A$ and the head 160 has a center of gravity $CG_H$. The head 160 may include a camera 162 (e.g., visible light and/or infrared camera), radar, LIDAR (Light Detection And Ranging, which can entail optical remote sensing that measures properties of scattered light to find range and/or other information of a distant target), LADAR (Laser Detection and Ranging), a communication device (radio frequency, wireless, etc.), and/or other components.

To achieve reliable and robust autonomous or semi-autonomous movement, the robot 100 may include a sensor system having several different types of sensors. The sensors can be used in conjunction with one another to create a perception of the robot's environment (i.e., a local sensory perception) sufficient to allow a control system for the robot 100 to determine actions to take in that environment. The sensor system 400 may include one or more types of sensors supported by the robot body 110, which may include obstacle detection obstacle avoidance (ODOA) sensors, communication sensors, navigation sensors, and so on.

For example, these sensors may include proximity sensors, contact sensors, cameras (e.g., volumetric point cloud imaging, three-dimensional (3D) imaging or depth map sensors, visible light camera and/or infrared camera), sonar (e.g., ranging sonar and/or imaging sonar), radar, LIDAR (Light Detection And Ranging, which can entail optical remote sensing that measures properties of scattered light to find range and/or other information of a distant target), LADAR (Laser Detection and Ranging), laser scanner, ultrasound sensor, and so on.

In some implementations, the robot 100 includes a robot controller 200 in communication with the drive system 115, the arm 150, and any head(s) 160 or gripper(s) 170 mounted on the arm 150. The robot controller 200 may issue drive commands to one or more motors driving the main tracks 120 and the flipper tracks 140. Moreover, the robot controller 200 may issue rotational commands to a flipper motor 135 to rotate the flippers 130 about the drive axis 15. The robot controller 200 may include one or more computer processors and associated memory systems.

The robot controller 200 may be implemented in hardware, software, firmware, or combinations of hardware, software and/or firmware. In some examples, the robot controller 200 may be implemented using a non-transitory computer readable medium storing computer executable instructions that when executed by one or more processors of a computer cause the computer to perform operations. Computer readable media may include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the robot controller 200 may be located on a single device or computing platform or may be distributed across multiple devices or computing platforms.

The proximity sensors may be converging infrared (IR) emitter-sensor elements, sonar sensors, ultrasonic sensors, and/or imaging sensors (e.g., 3D depth map image sensors) that provide a signal to a robot controller 200 when an object is within a given range of the robot 100. The robot controller 200 (executing a control system) may execute behaviors that cause the robot 100 to take an action, such as changing its direction of travel, when an obstacle is detected.

In some examples, the sensor system includes an inertial measurement unit (IMU) in communication with the robot controller 200 to measure and monitor a moment of inertia of the robot 100 with respect to the overall center of gravity CGR of the robot 100. The robot controller 200 may monitor any deviation in feedback from the IMU from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

When accelerating from a stop, the robot controller 200 may take into account a moment of inertia of the robot 100 from its overall center of gravity CGR to prevent robot tipping. The robot controller 200 may use a model of its pose, including its current moment of inertia. When payloads are supported, the robot controller 200 may measure a load impact on the overall center of gravity CGR and monitor movement of the robot moment of inertia. If this is not possible, the robot controller 200 may apply a test torque command to the drive system 115 and measure actual linear and angular acceleration of the robot using the IMU, in order to experimentally determine safe limits.

The robot controller 200 may include a communication system 202, which includes, for example, a radio to communicate with the remote operator control unit (OCU) 50 to receive commands and issue status and/or navigation information. The OCU 50 may include a display 52 (e.g., LCD or touch screen), a keyboard 54, and one or more auxiliary user inputs 56, such as a joystick or gaming unit. The OCU 50 may also include a computing processor and memory in communication. The processor is programmed for rendering graphics on the display 52. The OCU 50 allows an operator or user to control the robot 100 from a distance. In some examples, the user can select different levels of human control over the robot 100, ranging from a teleoperation mode, in which the user directly controls the motors and actuators on the robot 100, to autonomous operation, in which the user passes higher-level commands to the robot 100. In partially autonomous operation, the robot 100 can perform tasks such as following a perimeter or wall, recovering from getting stuck in an opening or due to high centering on an obstruction, evading a moving object, or seeking light.

The robot controller 200 can be mounted in any appropriate location on the robot 100. In some implementations, the robot controller 200 is mounted on the main body 110 in a location spanning between the drive tracks or wheels. The main body 110 may include a control electronics housing that is part of the main body 110, i.e., integrated into the shape of the main body 110. This morphology results in the arm 150 payload being positioned on top of the control electronics housing. This arrangement increases the vertical height of the robot 100 when the arm 150 is installed. Alternatively, the robot controller 200 can be located in another location to open more space for the arm 150.

Figure 2A:
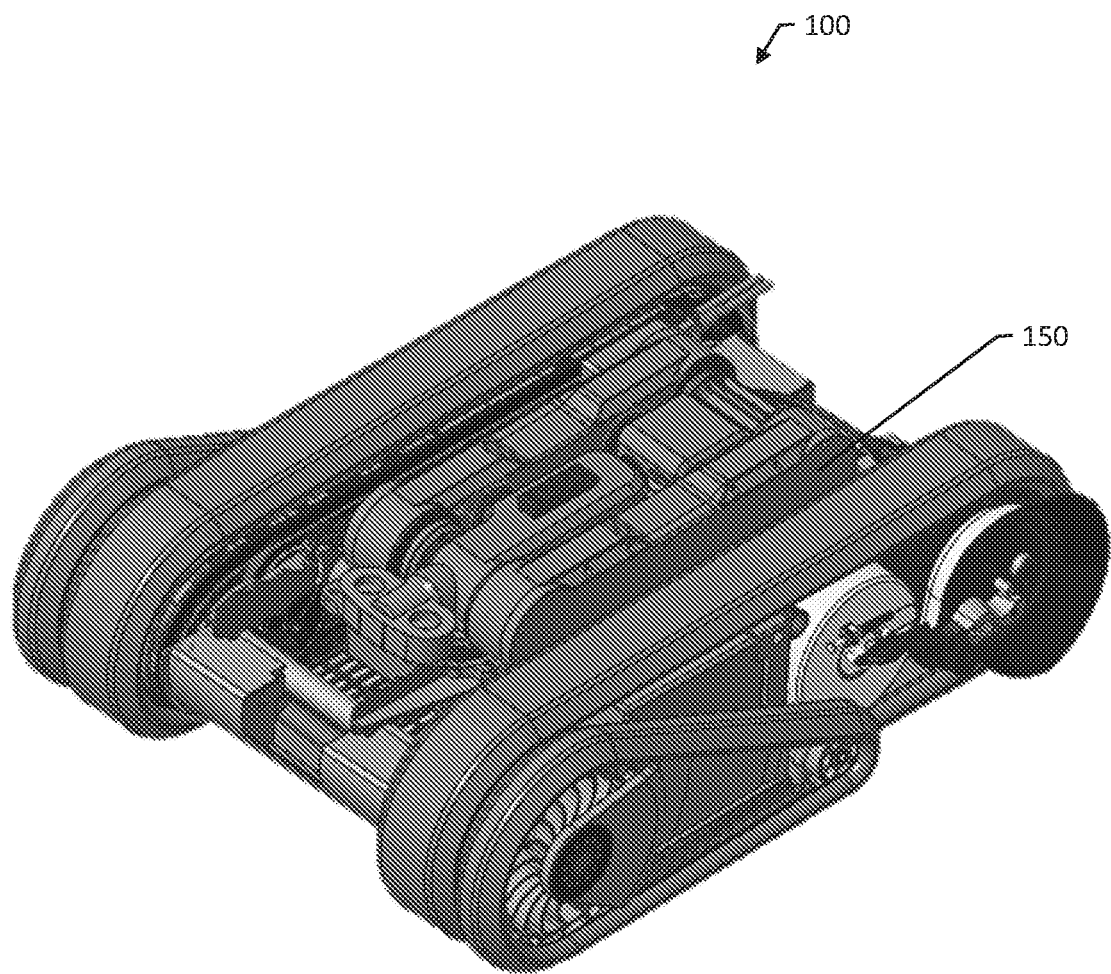
FIGS. 2A-C illustrate the example robot in a morphology that allows the manipulator to be stowed entirely within the geometric envelope of the robot chassis.
Figure 2B:
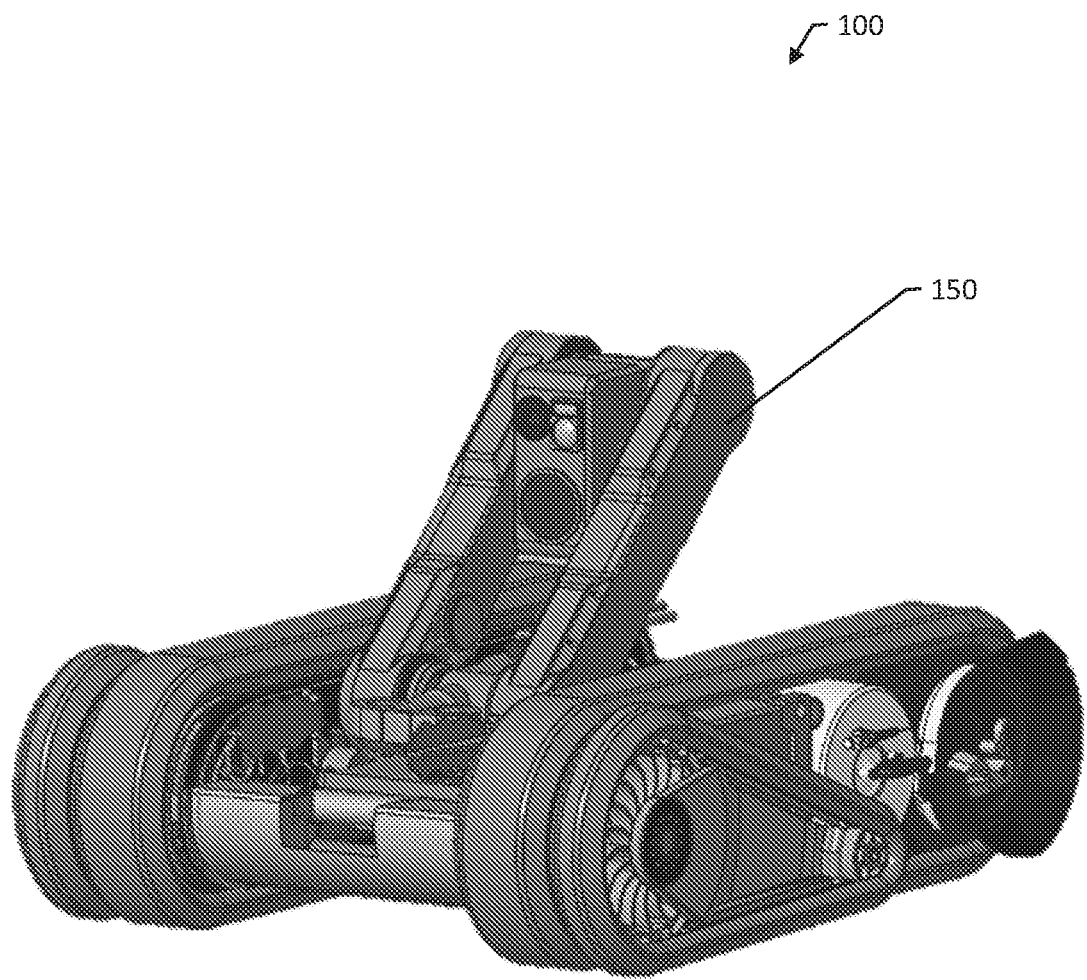
Figure 2C:
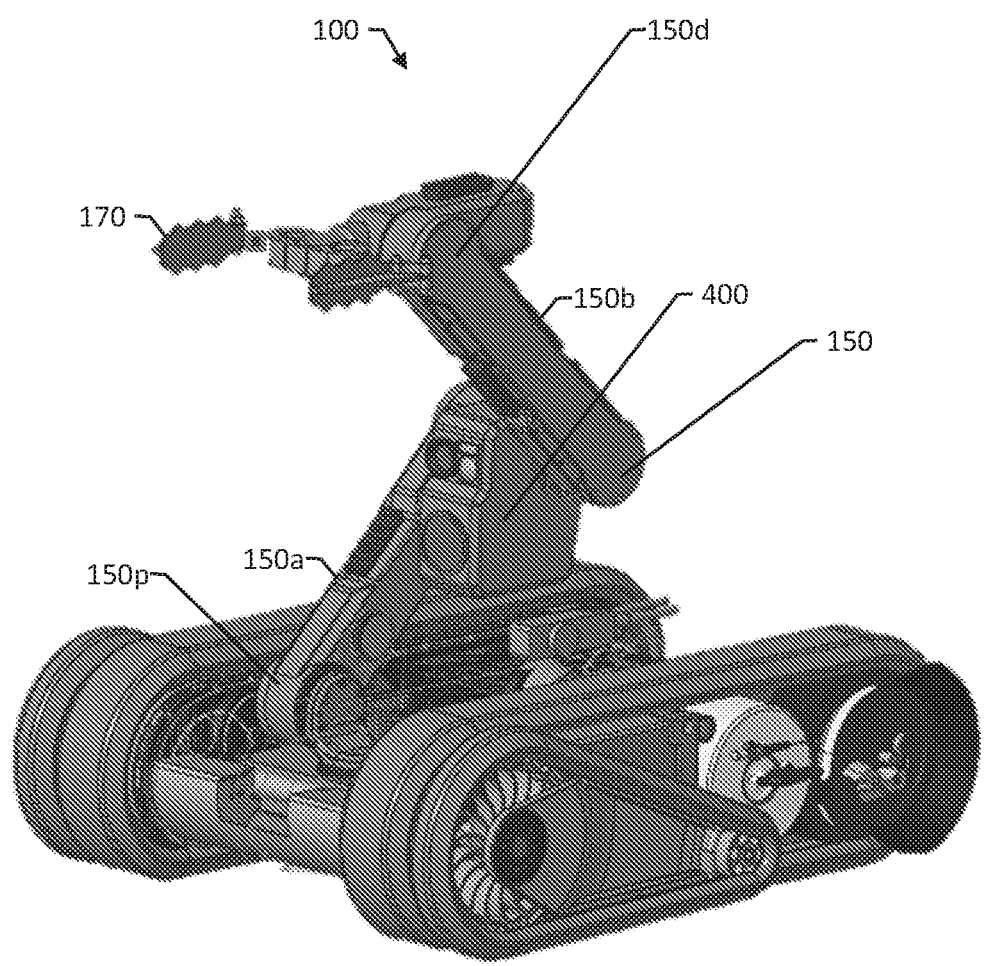

FIGS. 2A-C illustrate the example robot 100 in a morphology that allows the manipulator 150 (and related equipment such as motors) to be stowed entirely within the geometric envelope of the robot chassis. Stowing the manipulator in this manner provides a more compact arrangement for storage and fitment within a carrying bag or backpack. When stowed within the chassis, the manipulator is also better protected from damage during accidental drops or impacts.

With this morphology, the overall height of the robot 100 is not increased when the manipulator is installed (and when it is folded into a stowed position). There are at least several benefits:

Having a manipulator that stows entirely within the envelope of the robot chassis provides the end-user with the ability to pack the entire robot assembly (chassis and manipulator) within a single backpack, to be carried by one person. When preparing for a robot mission, no coordination with other individuals is needed and no assembly is required. This results in more rapid robot system preparation and deployment.

When stowed within the chassis, the manipulator is better protected from damage during accidental drops or impacts. The manipulator payload often includes sensitive cameras and sensors which are prone to impact damage.

With a lower robot height, the vehicle is capable of driving underneath objects such as when inspecting vehicles, thus expanding the mission capability. Traditional robots would need to remove the manipulator for such missions.

FIG. 2A shows the robot 100 with the manipulator 150 in a stowed position. FIG. 2B shows the robot 100 with the manipulator 150 in a partially extended position. FIG. 2C shows the robot 100 with the manipulator 150 in a mostly extended position. The robot 100 as illustrated includes an optional sensor suite 400, e.g., an Intelligence, Surveillance, and Reconnaissance (ISR) sensor suite.

The example manipulator 150 has a pivot end 150$p$ pivotally coupled to the main body 110 and a distal end 150$d$ that receives a gripper 170. The manipulator 150 includes a first extension 150$a$ extending away from the pivot end 150$p$ and a second extension 150$b$ extending away from the end of the first extension 150$a$. The second extension 150$b$ is pivotally coupled to the first extension 150$a$, e.g., by way of a bridge housing a motor for pivoting the second extension 150$b$. Various other types of manipulators can be used.

Figure 3A:
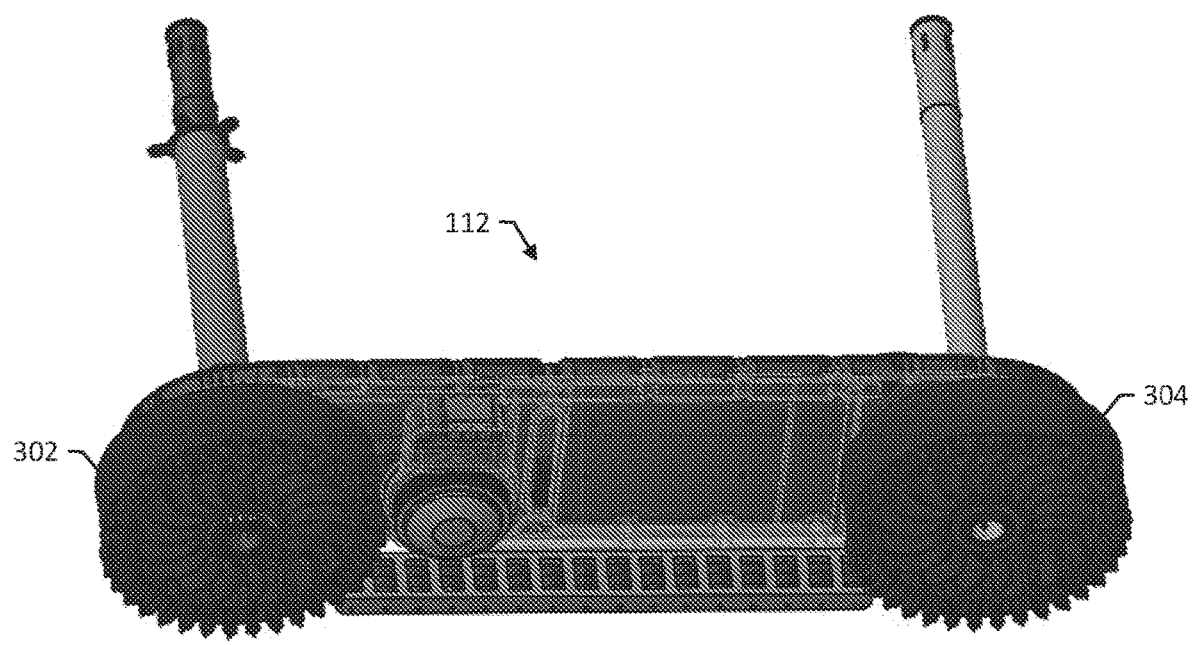
FIGS. 3A-C illustrate an example sideplate for the robot.
Figure 3B:
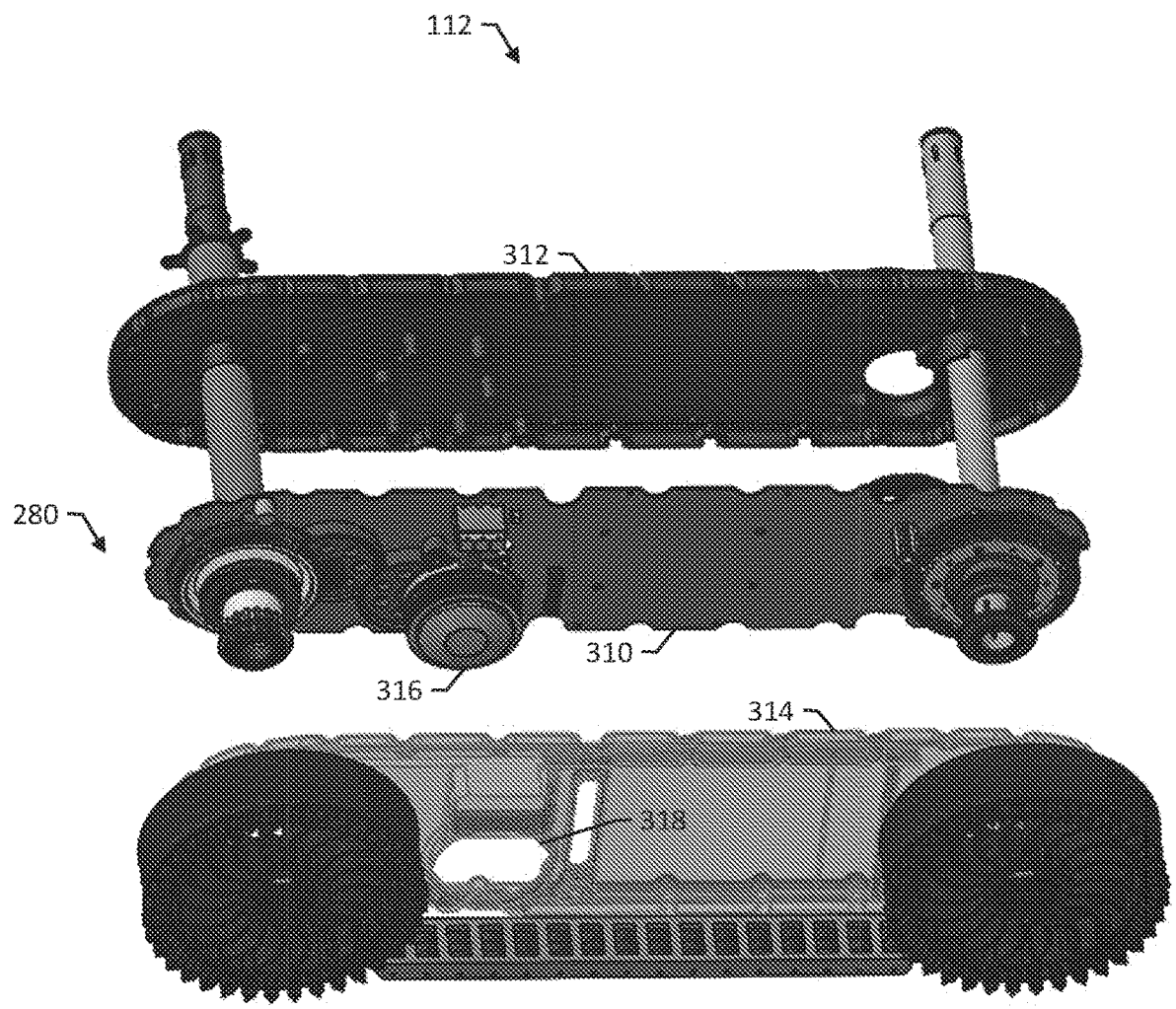
Figure 3C:
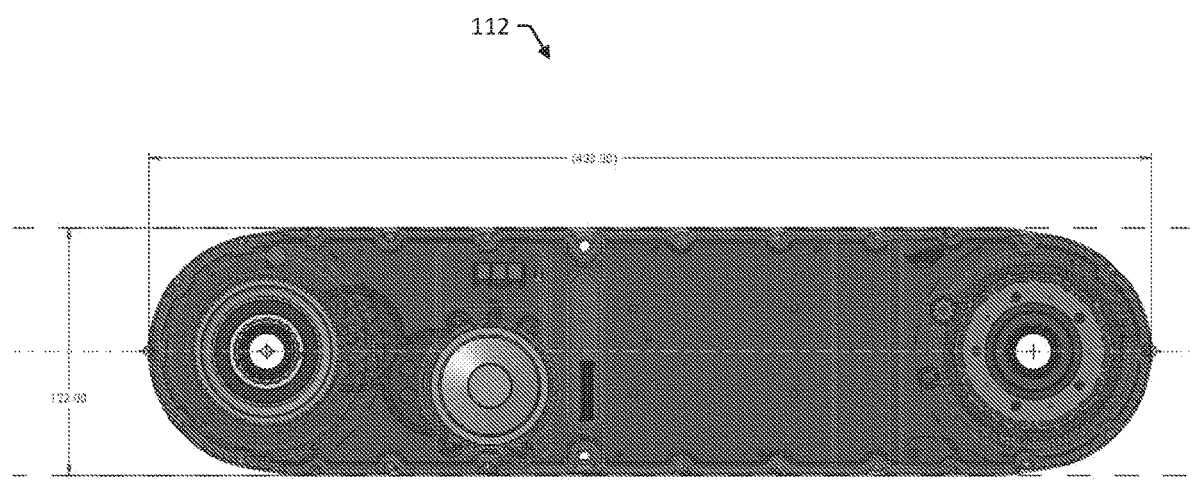

FIGS. 3A-C illustrate an example sideplate 112 for the robot 100 that enable the manipulator 150 to be stowed entirely within the geometric envelope of the robot chassis. The sideplate 112 for one side (left or right) or the robot is illustrated; an opposite sideplate for the other side of the robot can be a mirror image of the illustrated sideplate 112.

The morphology of the robot 100 houses the control electronics within the chassis sideplates—that are within the envelopes of the main drive tracks. This results in an open chassis "tub" spanning the tracks and sideplates. The open "tub" allows the manipulator payload to be mounted lower. The manipulator geometry is designed to be contained entirely within the payload "tub" volume when folded. In some implementations, the radio 202 remains in the central volume and is moved up against a sideplate to accommodate the manipulator 150.

FIG. 3A shows a perspective view of the sideplate 112 with the control electronics housed within the sideplate 112. The sideplate 112 extends from a front wheel 302 to a rear wheel 304. The sideplate 112 can be the same height or about the same height as the front and rear wheels 302 and 304. The control electronics can include the robot controller 200 and one or more motors. In some examples, the control electronics includes a motor for pivoting the manipulator 150 about the pivot end 150$p$.

FIG. 3B shows an exploded view of the sideplate 112. The sideplate 112 includes a sideplate enclosure 312, a sideplate cover 314, and a printed circuit board 310 sandwiched between the sideplate enclosure 312 and the sideplate cover 314. When assembled, the sideplate enclosure 312 faces the interior volume of the robot and the sideplate cover 314 faces away from the robot.

The control electronics 280 can include the printed circuit board 310 and components that are mounted to the printed circuit board 310, e.g., a motor 316. The motor 316 may include a heatsink that protrudes from the surface of the printed circuit board 310. The sideplate cover 314 can include an aperture 318 sized to allow the motor 316 (or the heatsink or both) to pass through. As a result, when assembled, the motor 316 (or the heatsink or both) may protrude into the volume between the front and rear wheels 302 and 304.

FIG. 3C shows a side view of the sideplate 112 a track to illustrate example dimensions of the sideplate 112. The sideplate 112 may be 493.9 mm long and 122 mm tall. In some implementations, the sideplates are molded plastic and machined aluminum heatsinks can be used to dissipate heat from the motors and controller in select areas. The heatsinks are bonded (epoxied) to the plastic sideplates.

Figure 4A:
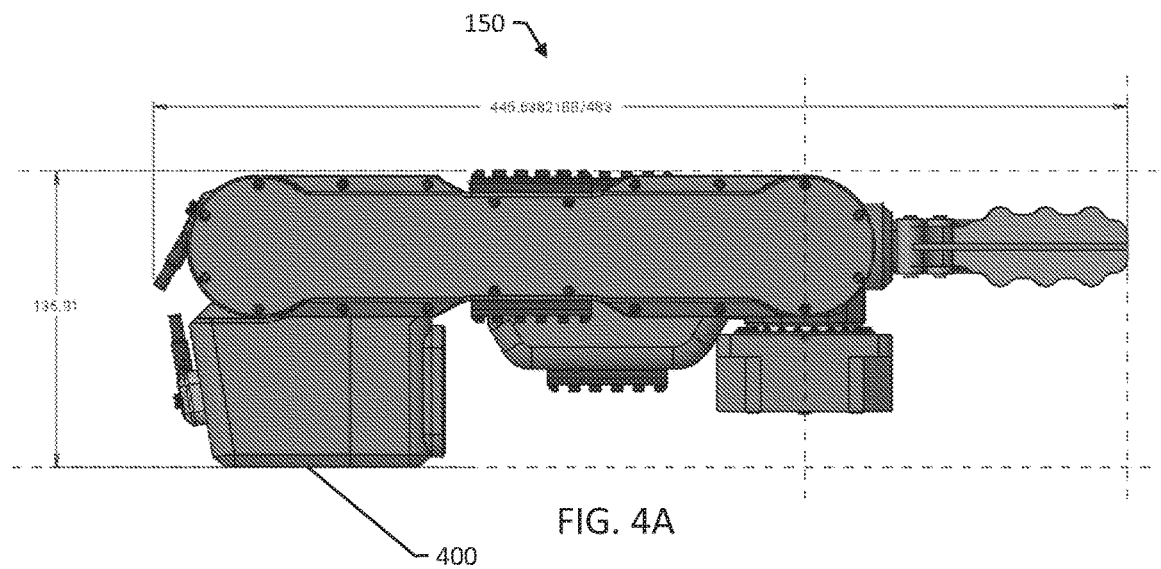
FIGS. 4A-B illustrate an example manipulator with an attached sensor suite.
Figure 4B:
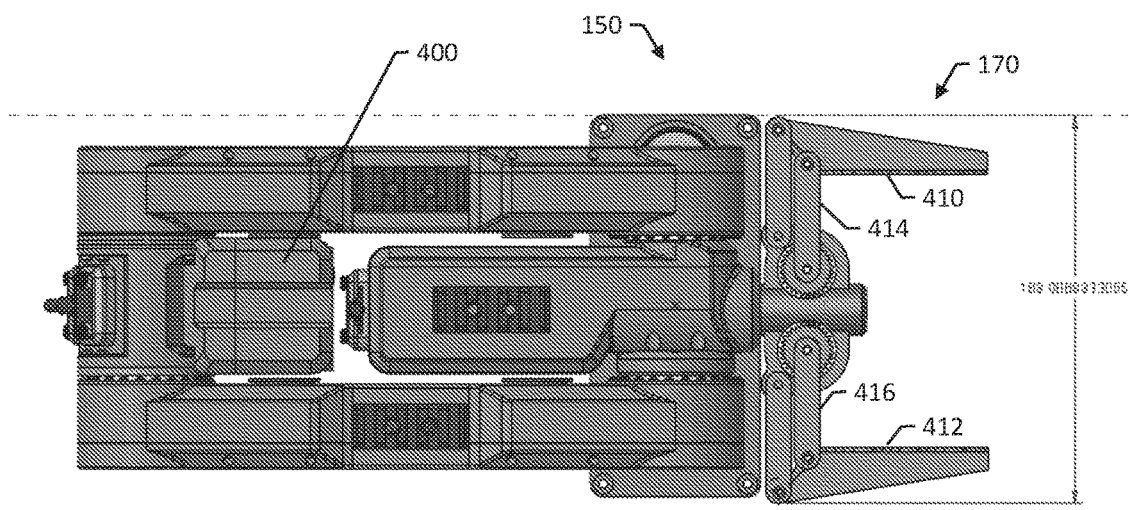

FIGS. 4A-B illustrate an example manipulator 150 with an attached sensor suite 400. The manipulator may be 445.6 mm long and 135.9 mm tall. FIG. 4A is a side view of the manipulator 150 and FIG. 4B is a top view of the manipulator 150. FIG. 4B illustrates a gripper 170 at a distal end of the manipulator 150. The gripper 170 includes a left grip 410 and a right grip 412. As shown in FIG. 4B, the left and right grips 410 and 412 are retracted (e.g., for stowage) so that left and right interior members 414 and 416 of the left and right grips 410 and 412 are aligned across the robot body, i.e., from left to right across the robot.

Figure 5A:
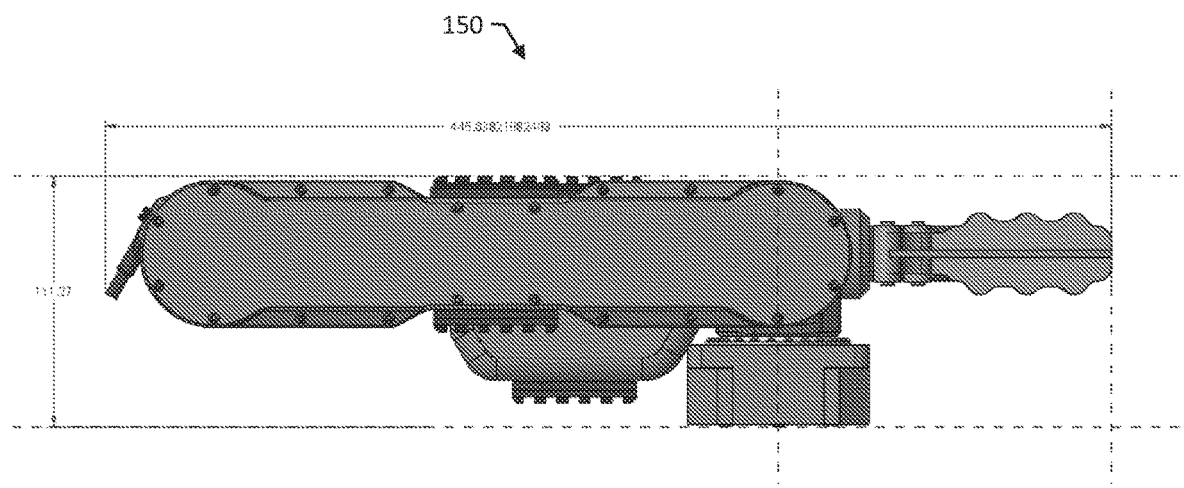
FIGS. 5A-B illustrate an example manipulator lacking the sensor suite of FIGS. 4A-B.
Figure 5B:
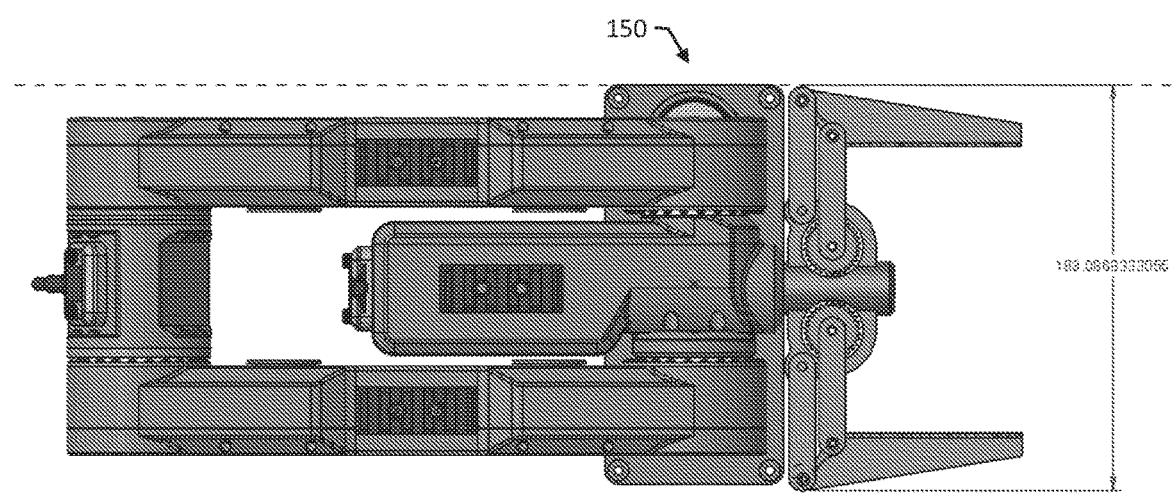

FIGS. 5A-B illustrate an example manipulator 150 lacking the sensor suite 400 of FIGS. 4A-B. The manipulator may be 445.6 mm long and 111.27 mm tall. FIG. 5A is a side view of the manipulator 150. FIG. 5B is a top view of the manipulator 150.

Figure 6:
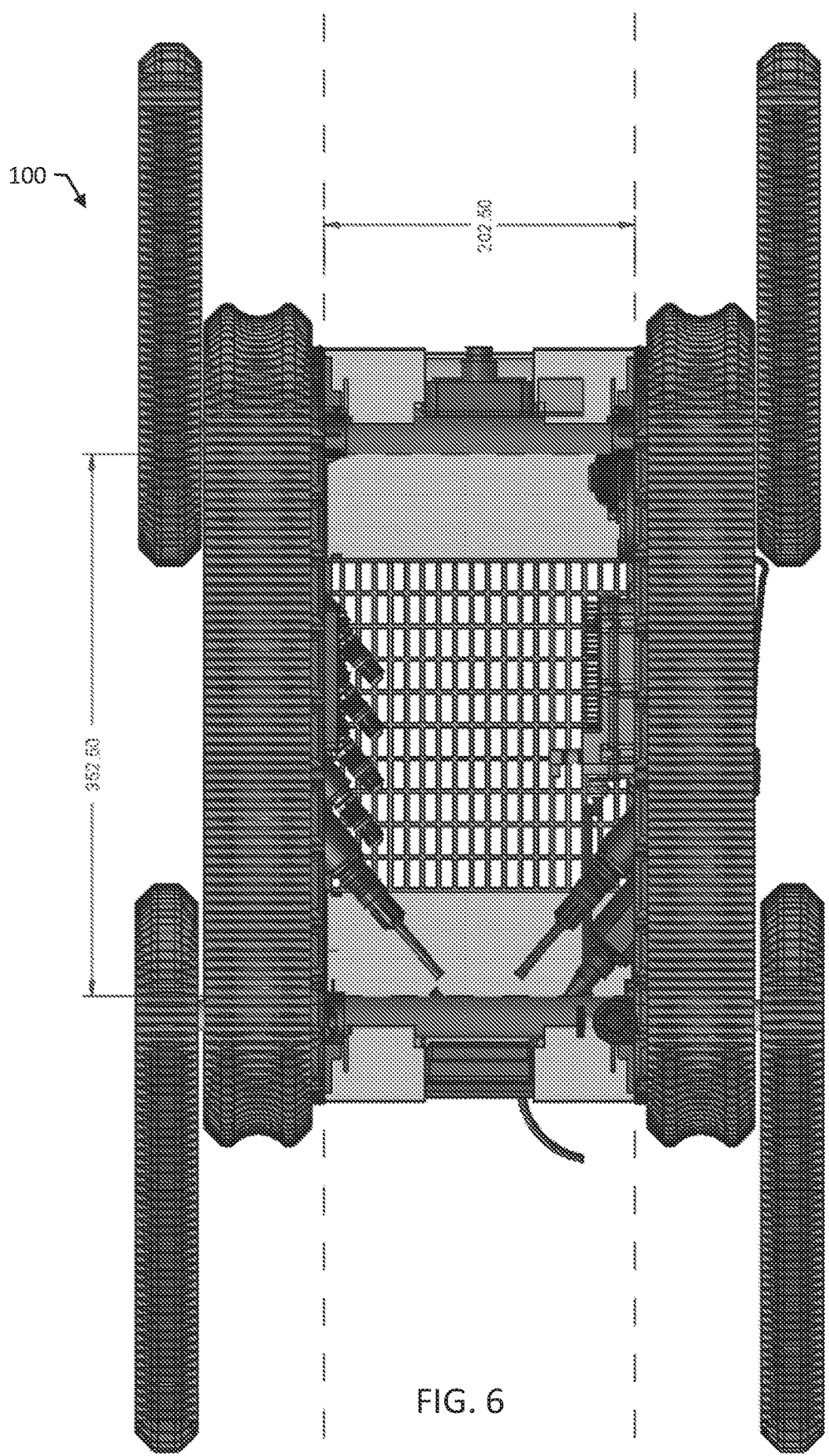
FIG. 6 is a top view of the robot illustrating the payload tub volume that is configured to store the manipulator.
Figure 7:
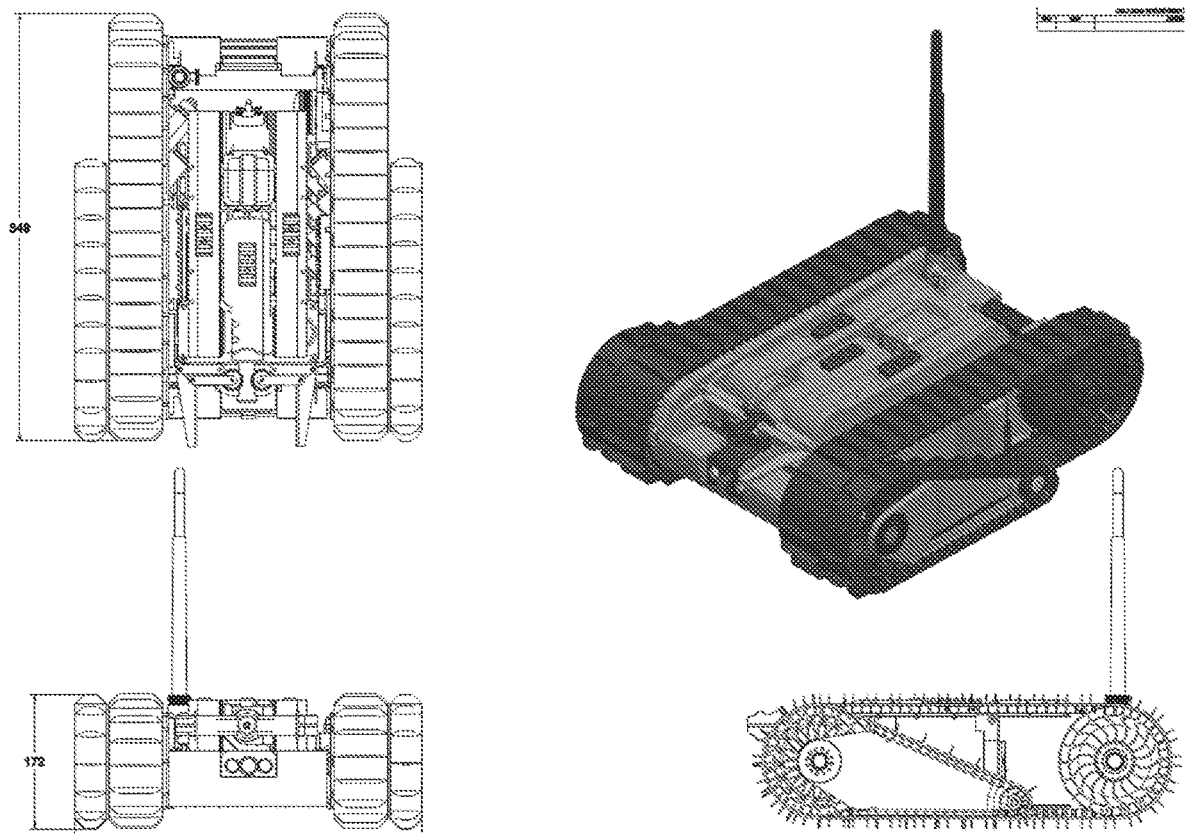
FIG. 7 shows alternate views of the robot.

FIG. 6 is a top view of the robot 100 illustrating the payload tub volume that is configured, by virtue of housing control electronics in sideplates, to store the manipulator entirely within a geometric volume of the robot 100 when the manipulator is stowed. The payload tub volume may be 352.5 mm long and 202.5 mm wide. FIG. 7 shows alternate views of the robot 100.

Figure 8:
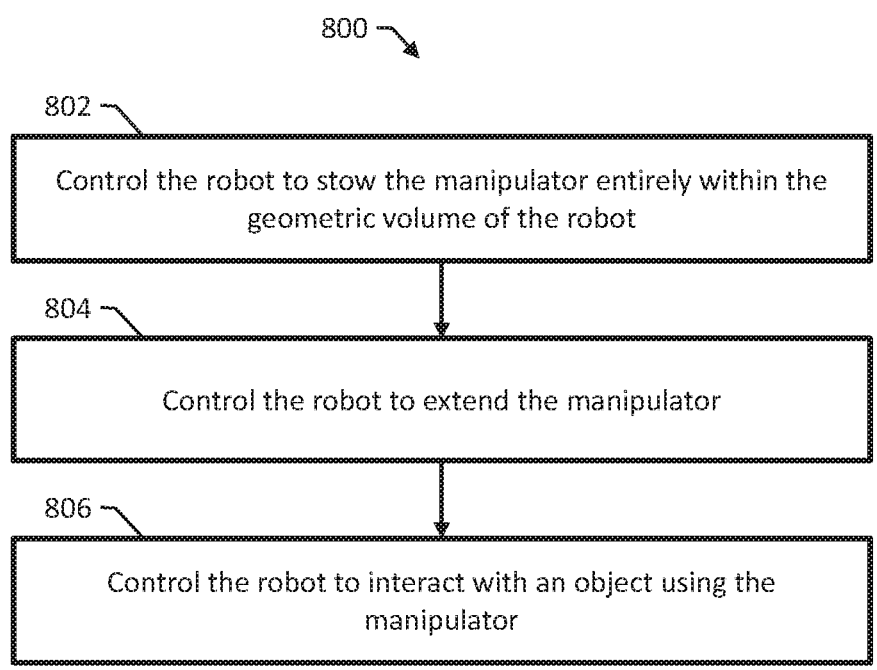
FIG. 8 is a flow chart of an example method for controlling the robot.

FIG. 8 is a flow chart of an example method 800 for controlling the robot 100. The method 800 can be performed by the robot controller 200. The robot controller 200 controls the robot to stow the manipulator 150 entirely within a geometric volume of the robot (802), e.g., by driving appropriate pivoting motors with control signals to pivot the manipulator 150 into the payload tub volume. With the manipulator 150 stowed, the robot 100 can be transported, e.g., in a backpack. Later, the robot 100 is then deployed. The robot controller 200 controls the robot 100 to extend the manipulator 150 from its stowed position (804). The robot controller 200 controls the robot 100 to interact with an objet using the extended manipulator 150.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An unmanned ground vehicle comprising:
a main body;
a drive system supported by the main body, the drive system comprising right and left driven track assemblies mounted on right and left sides of the main body; and
a manipulator arm pivotally coupled to the main body and configured to extend from a stowed position to an extended position, wherein the manipulator arm in the stowed position is contained entirely within a geometric volume of the right and left driven track assemblies;
wherein the manipulator arm comprises a first section pivotally coupled to the main body at a pivot end and a second section pivotally coupled to the first section at an end opposite the pivot end;
wherein the manipulator arm comprises a sensor suite mounted on a bridge between the first section and the second section.

2. The unmanned ground vehicle of claim 1, wherein the manipulator arm comprises a gripper coupled to the second section.

3. The unmanned ground vehicle of claim 1, comprising control electronics housed within one of the right and left driven track assemblies.

4. The unmanned ground vehicle of claim 3, wherein the control electronics comprises a robot controllerconfigured to control the drive system and the manipulator arm by supplying control signals to one or more drive system motors and one or more manipulator motors.

5. The unmanned ground vehicle of claim 3, wherein the control electronics are housed within a sideplate of one of the right and left driven track assemblies, resulting in an open chassis tub spanning the right and left driven track assemblies, and wherein the manipulator arm is configured to fold, by pivoting first and second sections of the manipulator arm, into the open chassis tub.

6. The unmanned ground vehicle of claim 5, wherein the sideplate is formed of molded plastic, and wherein the sideplate includes one or more machined aluminum heatsinks bonded to the sideplate to dissipate heat from the control electronics.

7. The unmanned ground vehicle of claim 1, comprising a radio antenna coupled to the main body next to a sideplate of one of the right and left driven track assemblies.

8. The unmanned ground vehicle of claim 1, comprising right and left flippers extending beyond a front end of the main body.

9. The unmanned ground vehicle of claim 8, wherein each of the right and left flippers pivots about a drive axis of drive system.

10. The unmanned ground vehicle of claim 9, wherein each of the right and left flippers comprises a driven flipper track trained about a flipper drive wheel which is driven about the drive axis.

11. The unmanned ground vehicle of claim 1, comprising a communication system configured to communicate with a remote operator control unit to receive commands to extend or stow the manipulator arm.

12. The unmanned ground vehicle of claim 1, wherein in the stowed position the manipulator arm is contained entirely within a geometric envelope of the main body.

13. The unmanned ground vehicle of claim 1, wherein the sensor suit comprises a camera.

14. The unmanned ground vehicle of claim 1, wherein the sensor suit comprises at least one of an ultrasound sensor and a radar.

15. A method for controlling an unmanned ground vehicle, the method comprising:
   controlling, by a robot controller, a manipulator arm of the unmanned ground vehicle to stow the manipulator arm in a stowed position entirely within a geometric volume of right and left driven track assemblies of the unmanned ground vehicle;
   controlling, by the robot controller, the manipulator arm to extend from the stowed position to as extended position outside of the geometric volume of the right and left drive track assemblies; and
   controlling, by the robot controller, the unmanned ground vehicle to interact with an object using the manipulator arm;
   wherein the manipulator arm comprises a first section pivotally coupled to the main body at a pivot end and a second section pivotally coupled to the first section at an end opposite the pivot end;
   wherein the manipulator arm comprises a sensor suite mounted on a bridge between the first section and the second section.

16. The method of claim 15, wherein in the stowed position the manipulator arm is contained entirely within a geometric envelope of the main body.

17. The method of claim 15, wherein the manipulator arm comprises a gripper coupled to the second section.

18. The method of claim 15, wherein the unmanned ground vehicle comprises control electronics housed within one of the right and left driven track assemblies;
   wherein the control electronics comprises a robot controller configured to control the drive system and the manipulator arm by supplying control signals to one or more drive system motors and one or more manipulator motors;
   wherein the control electronics are housed within a sideplate of one of the right and left driven track assemblies, resulting in an open chassis tub spanning the right and left driven track assemblies, and wherein the manipulator arm is configured to fold, by pivoting first and second sections of the manipulator arm, into the open chassis tub.

19. The method of claim 18, wherein the sideplate is formed of molded plastic, and wherein the sideplate includes one or more machined aluminum heatsinks bonded to the sideplate to dissipate heat from the control electronics.

20. The method of claim 15, wherein the unmanned ground vehicle comprises a radio antenna coupled to the main body next to a sideplate of one of the right and left driven track assemblies.

* * * * *